US005722634A

United States Patent [19]

Hrytzak et al.

[11] Patent Number: 5,722,634

[45] Date of Patent: Mar. 3, 1998

[54] PINTLE-TYPE EGR VALVE

[75] Inventors: Bernard J. Hrytzak, Chatham, Canada; Takeshi Gomi, Saitama, Japan; Hirotomi Nemoto, Saitama, Japan; Yoshio Yamamoto, Saitama, Japan

[73] Assignees: Siemens Electric Limited, Ontario, Canada; Honda Giken Kogyo Kabushiki Kaisha, Tokyo, Japan

[21] Appl. No.: 820,826

[22] Filed: Mar. 19, 1997

Related U.S. Application Data

[63] Continuation of Ser. No. 520,540, Aug. 29, 1995, abandoned.

[51] Int. Cl.$^{6}$ .......... F16K 31/06

[52] U.S. Cl. .......... 251/129.15

[58] Field of Search .......... 251/129.15, 129.18, 251/122, 356; 123/571

[56] References Cited

U.S. PATENT DOCUMENTS

| | | | |
|---|---|---|---|
| 3,927,650 | 12/1975 | Smith et al. . | |
| 4,056,084 | 11/1977 | Baumgartner . | |
| 4,312,319 | 1/1982 | Brakebill . | |
| 4,351,285 | 9/1982 | Bradshaw . | |
| 4,815,706 | 3/1989 | Feuling | 251/356 |
| 5,027,781 | 7/1991 | Lewis . | |
| 5,131,624 | 7/1992 | Kreuter et al. | 251/129.18 |
| 5,435,519 | 7/1995 | Everingham . | |
| 5,460,146 | 10/1995 | Frankenberg | 251/129.15 X |
| 5,467,962 | 11/1995 | Bircann et al. | 251/129.15 |

FOREIGN PATENT DOCUMENTS

| | | | |
|---|---|---|---|
| 295 06 928 | 6/1995 | Germany . | |
| 6-129560 | 5/1995 | Japan | 251/129.15 |
| 88 07625 | 10/1988 | WIPO . | |

OTHER PUBLICATIONS

Seven-page European Search Report, PCT/CA96/00559 dated Nov. 27, 1996.

*Primary Examiner*—Kevin Lee

[57] ABSTRACT

Improvements in a head (44) of a pintle (38) and associated valve seat (34) of an EGR valve (10) for providing a desired geometric relationship between respective tapered surfaces (36c, 104) that close against each other and for reducing tendency for carbon build-up. A blind hole (108) extends centrally axially inward from the lower end face (107) of the pintle head, reducing the mass, and hence thermal inertia, but without affecting the desired geometric relationship of the seat to the pintle head.

11 Claims, 3 Drawing Sheets

PINTLE-TYPE EGR VALVE

CROSS-REFERENCE TO RELATED APPLICATION

This is a continuation of Ser. No. 08/520,540 filed on Aug. 29, 1995, now abandoned.

FIELD OF THE INVENTION

This invention relates to exhaust gas recirculation (EGR) valves of the type used in exhaust emission control of internal combustion engines, and in particular to a novel construction for a pintle-type EGR valve.

BACKGROUND AND SUMMARY OF THE INVENTION

Exhaust gas recirculation is a technique that is used to reduce the oxides of nitrogen content of internal combustion engine exhaust gases. An EGR valve controls the amount of exhaust gas that is recirculated to mix with a fresh air-fuel induction stream that enters combustion chamber space of an engine. A pintle-type valve can provide a variable restriction that is as precise as the ability to position a metal pintle relative to a metal valve seat. One means for enabling a pintle-type EGR valve to achieve more precise positioning, and hence better control, is by making the EGR valve electrically actuated, such as by incorporating a solenoid actuator into the EGR valve. Prior patents disclose various embodiments of solenoid-actuated, pintle-type valves.

In a typical automotive vehicle having an internal combustion engine, the engine will be turned on when the vehicle is to be driven and otherwise turned off. During its life, the engine and intimately associated components, including an EGR valve, will experience repeated thermal cycling. Over time, carbon deposits may build on an EGR valve element and valve seat, affecting the accuracy of EGR control, even in a solenoid-operated EGR valve.

The present invention addresses the carbon build-up problem, and provides a solution that can alleviate the problem by substantially eliminating it, or at least reducing the rate of carbon build-up to better assure EGR system compliance with applicable regulations.

The invention arises in part through the recognition that thermal inertia of EGR valve parts is a contributor to carbon deposits. Accordingly, one aspect of the invention involves reducing the thermal inertia of the pintle valve head, but in a manner that is independent, and allows the establishment, of a desired geometric relationship between the valve head and the valve seat that defines the valve's restriction as a function of pintle position relative to the valve seat. Thus, the invention contemplates a structuring of the valve head by simple machining procedures to reduce its mass, and hence its thermal inertia, without affecting the establishment of such geometric relationship between the pintle valve head and the valve seat. Reduction of the mass also contributes to faster EGR valve response, especially in a fast-acting solenoid actuated valve that is constructed in the manner disclosed herein.

Principles of the invention can be gleaned from the ensuing disclosure of details of a specific embodiment that represents the best mode contemplated at this time for carrying out the invention. The drawings that accompany the disclosure depict in particular detail a presently preferred embodiment of the invention.

DESCRIPTION OF THE PREFERRED EMBODIMENT

Figure 1:
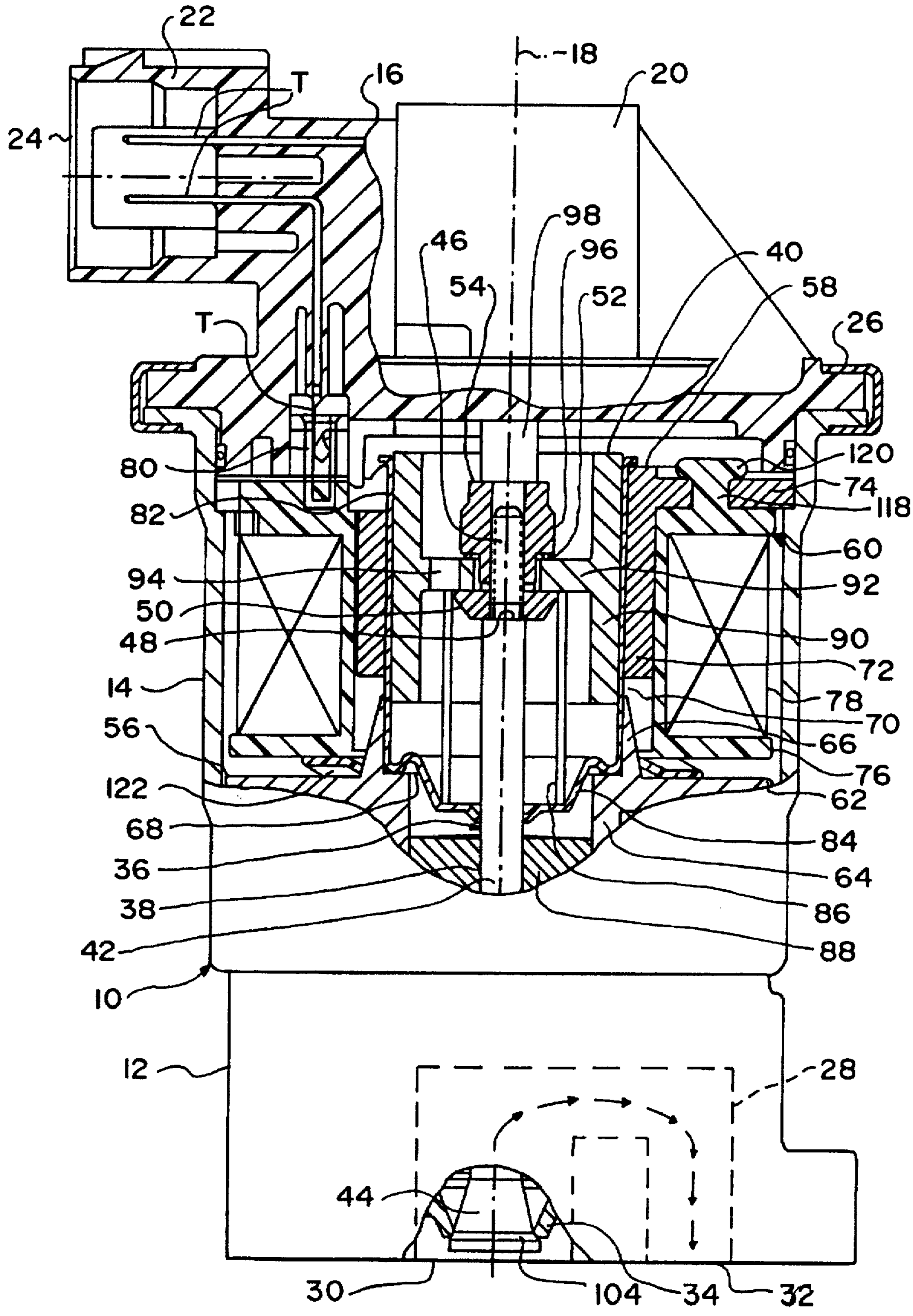
FIG. 1 is a longitudinal view, partly in cross section, of an electric EGR valve (EEGR valve) embodying principles of the invention.

The drawing Figures illustrate an electric EGR valve (EEGR valve) 10 embodying principles of the present invention. FIG. 1 shows the general arrangement of EEGR valve 10 to comprise a metal base 12, a generally cylindrical metal shell 14 disposed on top of and secured to base 12, and a sensor cap 16 forming a closure for the otherwise open top of shell 14.

Base 12 comprises a flat bottom surface adapted to be disposed against a surface of an exhaust manifold of an internal combustion engine, typically sandwiching a suitably shaped gasket (not shown) between itself and the manifold. Base 12 comprises a flange having through-holes (not shown) that provide for the separable attachment of EEGR valve 10 to an exhaust manifold. For example, the manifold may contain a pair of threaded studs which pass through the flange through-holes and onto the free ends of which lock washers are first placed, followed by nuts that are threaded onto the studs and tightened to force base 12 toward the manifold, thereby creating a leak-proof joint between valve 10 and the manifold. Reference numeral 18 designates a main longitudinal axis of EEGR valve 10.

Sensor cap 16 is a non-metallic part, preferably fabricated from suitable polymeric material. In addition to providing a closure for the otherwise open top end of shell 14, sensor cap 16 comprises a central cylindrical tower 20 and an electrical connector shell 22 that projects radially outwardly from tower 20. Tower 20 has a hollow interior shaped to house a position sensor that is utilized for sensing the extent to which EEGR valve 10 is open. Sensor cap 16 further contains several electrical terminals T that provide for a solenoid coil assembly (to be described later) and such a position sensor to be operatively connected with an engine electrical control system. Ends of terminals T are surrounded by shell 22 to form an electrical connector plug 24 that is adapted to mate with a mating plug (not shown) of an electrical wiring harness of an engine electrical control system. A metal clinch ring 26 securely attaches sensor cap 16 to shell 14.

Base 12 comprises an exhaust gas passageway 28 having an entrance 30 coaxial with axis 18 and an exit 32 that is spaced radially from entrance 30. Both entrance 30 and exit 32 register with respective passages in an engine exhaust manifold.

A valve seat 34 (shown by itself in FIGS. 2 and 3) is disposed in passageway 28 coaxial with entrance 30. An armature-pintle assembly 36 that is also coaxial with axis 18 comprises a pintle 38 (shown by itself in FIGS. 4–7) and an armature 40. Pintle 38 comprises a shaft 42 having a valve head 44 at the lower end and a threaded stud 46 at the upper end. Shaft 42 has a right angle shoulder 48 that is disposed just below threaded stud 46 and faces that end of the pintle. Valve head 44 is shaped for cooperation with an annular seat surface provided in seat 34 by a central through-opening in seat 34. Principles of the present invention involve certain features of valve head 44 and its relationship to seat 34, and they will be described in detail later on. Threaded stud 46 provides for attachment of pintle 38 to armature 40 by attachment means that includes a shim 50, a wave spring washer 52, and a nut 54. FIG. 1 depicts the closed position of EEGR valve 10 wherein valve head 44 is seated closed on seat 34.

EEGR valve 10 further comprises a lower stator member 56, an upper stator member 58, and a solenoid coil assembly 60. Lower stator member 56 comprises a circular flange 62 immediately below which is a smaller diameter cylindrical wall 64 and immediately above which is a tapered cylindrical wall 66. A through-hole extends centrally through member 56 and comprises a right angle shoulder 68 at the base of wall 66 making the upper portion of the through-hole of larger diameter than that of the lower portion of the through-hole. The upper edge surface of wall 66 is relatively pointed and although it does have a finite radial thickness, that thickness is considerably smaller than the radial thickness at the base of wall 66. The relatively pointed tapering of wall 66 is for the purpose of enhancing the magnetic characteristics of a magnetic circuit that includes members 56, 58, to be more fully described hereinafter.

Upper stator member 58 is cooperatively associated with lower stator member 56 to provide an air gap 70 in the magnetic circuit. Member 58 comprises a straight cylindrical side wall 72 having a flange 74 extending around its outside proximate its upper end. A slot in a portion of flange 74 provides a clearance for an electrical connection from solenoid coil assembly 60 to certain terminals T of sensor cap 16.

Solenoid coil assembly 60 is disposed within shell 14 between stator members 56 and 58. Solenoid coil assembly 60 comprises a non-metallic bobbin 76 having a straight cylindrical tubular core coaxial with axis 18, and upper and lower generally cylindrical flanges at the opposite axial ends of the core. A length of magnet wire is wound on the core between the flanges to form an electromagnet coil 78.

The bobbin is preferably an injection-molded plastic that possesses dimensional stability over a range of temperature extremes that are typically encountered in automotive engine usage. Two electrical terminals 80 (only one appearing in FIG. 1) are mounted in upwardly open sockets on the upper face of the upper bobbin flange, and a respective end segment of the magnet wire forming coil 78 is electrically connected to a respective one of the terminals 80.

FIG. 1 shows one of two upstanding posts 118 that are diametrically opposite each other on the upper face of the upper bobbin flange. Posts 118 pass through corresponding holes in flange 74 of upper stator member 58. FIG. 1 shows the condition of the posts after having been passed through the flange holes so that the upper face of the upper bobbin flange is disposed against the lower face of the upper stator flange. In this condition, the ends of the posts have been deformed from their previous straight shape that allowed them to pass through the flange holes to create mushroomed heads 120 that are against the upper stator flange to capture the stator flange between themselves and the upper bobbin flange. It should be noted that FIG. 1 shows the one post 118 and its head 120 ninety degrees out of position circumferentially, for illustrative clarity only, and it should be understood that neither of the two posts is diametrically opposite the electric terminals 80, but rather they are at ninety degrees circumferentially of terminals 80. A wave spring washer 122 is disposed around the outside of wall 66 and slightly compressed between the lower flange of bobbin 76 and flange 62 of lower stator member 56. Wave spring washer 122 serves to assure that the upper bobbin flange is maintained against the upper stator flange 74 should there for any reason, such as differential thermal expansion, be any looseness in the bobbin flange attachment to the upper stator flange.

Sensor cap 16 is also an injection-molded plastic part having two of the terminals T connecting respectively to the terminals 80 to provide for electrical connection of coil 78 with the engine electrical control system.

The accurate relative positioning of the two stator members 56, 58 is important in achieving the desired air gap 70 in a magnetic circuit that is provided by the two stator members and shell 14, all of which are ferromagnetic. A portion of armature 40 axially spans air gap 70, radially inward of walls 66 and 72. A non-magnetic sleeve 82 is disposed in cooperative association with the two stator parts and armature-pintle assembly 36. Sleeve 82 has a straight cylindrical wall extending from an outwardly curved lip at its upper end, to keep armature 40 separated from the two stator members. Sleeve 82 also has a lower end wall 84 that is shaped to provide a cup-shaped spring seat for seating a lower axial end of a helical coil spring 86, to provide a small circular hole for passage of pintle shaft 42, and also, as will be explained later, to provide a stop for limiting the downward travel of armature 40.

Guidance of the travel of armature-pintle assembly 36 along axis 18 is provided by a hole in a bearing guide member 88 that is press fit centrally to lower stator member 56. Pintle shaft 42 has a precise, but low friction, sliding fit in the bearing guide member hole.

Armature 40 is ferromagnetic and comprises a cylindrical wall 90 coaxial with axis 18 and a transverse internal wall 92 across the interior of wall 90 at about the middle of the length of wall 90. Wall 92 has a central circular hole that provides for the upper end of pintle 38 to be attached to armature 40 by fastening means that includes shim 50, wave spring washer 52, and nut 54. Wall 92 also has smaller bleed holes 94 spaced outwardly from, and uniformly around, its central circular hole.

Shim 50 serves to provide for passage of the upper end portion of pintle 38, to provide a locator for the upper end of spring 86 to be substantially centered for bearing against the lower surface of wall 92, and to set a desired axial positioning of armature 40 relative to air gap 70.

The O.D. of nut 54 comprises straight cylindrical end portions between which is a larger polygonally shaped portion 96 (i.e. a hex). The lower end portion of nut 54 has an O.D. that provides some radial clearance to the central hole in armature wall 92. When nut 54 is threaded onto threaded stud 46, wave spring washer 52 is axially compressed between the lower shoulder of hex 96 and the surface of wall 92 surrounding the central hole in wall 92. The nut is tightened to a condition where shoulder 48 engages shim 50 to force the flat upper end surface of shim 50 to bear with a certain force against the flat lower surface of wall 92. Nut 54 does not however abut shim 50. Wave spring washer 52 is, at that time, not fully axially compressed, and this type of joint allows armature 40 to position itself within sleeve 82 to better align to the guidance of the pintle that is established by bearing guide member 88. Hysteresis is minimized by minimizing any side loads transmitted from the pintle to the armature, or from the armature to the pintle, as the valve operates. The disclosed means for attachment of the pintle to the armature is highly effective for this purpose.

Sleeve 82 is fixedly positioned within the valve, and its lower end wall 84 is formed with an upwardly convex curved rim surrounding the top of its spring seat and disposed in the downward path of travel of the armature. Between this upwardly convex curved rim and the sleeve side wall is a downwardly convex curved rim that bears against shoulder 68 of lower stator member 56 so that the sleeve provides a stop for armature 40 that limits the extent to which armature-pintle assembly 36 can be displaced downwardly.

The closed position shown in FIG. 1 occurs when solenoid coil assembly 60 is not being energized by electric current from the engine electrical control system. In this condition, force delivered by spring 86 causes valve head 44 to be seated closed on seat 34. A plunger 98 associated with the position sensor contained within tower 20 of sensor cap 16 is self-biased against the flat upper end surface of nut 54.

As solenoid coil assembly 60 is increasingly energized by electric current from the engine control system, magnetic flux increasingly builds in the magnetic circuit comprising the two stator members 56, 58 and shell 14, interacting with armature 40 at air gap 70 through non-magnetic sleeve 82. This creates increasing magnetic downward force acting on armature 40, causing valve head 44 to increasingly open exhaust gas passageway 28 to flow. Bleed holes 94 assure that air pressure is equalized on opposite sides of the armature as the armature moves. Concurrently, spring 86 is being increasingly compressed, and the self-biased plunger 98 maintains contact with nut 54 so that the position sensor faithfully follows positioning of armature-pintle assembly 36 to signal to the engine control system the extent to which the valve is open.

Armature 40 is accurately axially positioned relative to air gap 70 by controlling the axial dimension of shim 50. The axial distance between the air gap and the valve seat is measured. The axial distance along the pintle between the location where valve head 44 seats on the valve seat and shoulder 48 is measured. Based on these two measurements, the axial dimension of shim 50 can be chosen such that armature 40, when fastened to the pintle and disposed against shoulder 48, will be in a desired axial position to the air gap.

Figure 3:
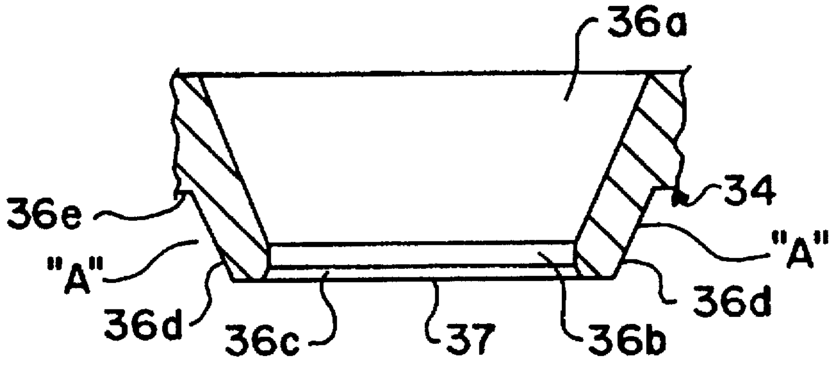
FIG. 3 is a fragmentary cross section view taken in the direction of arrows 3—3 in FIG. 2.
Figure 2:
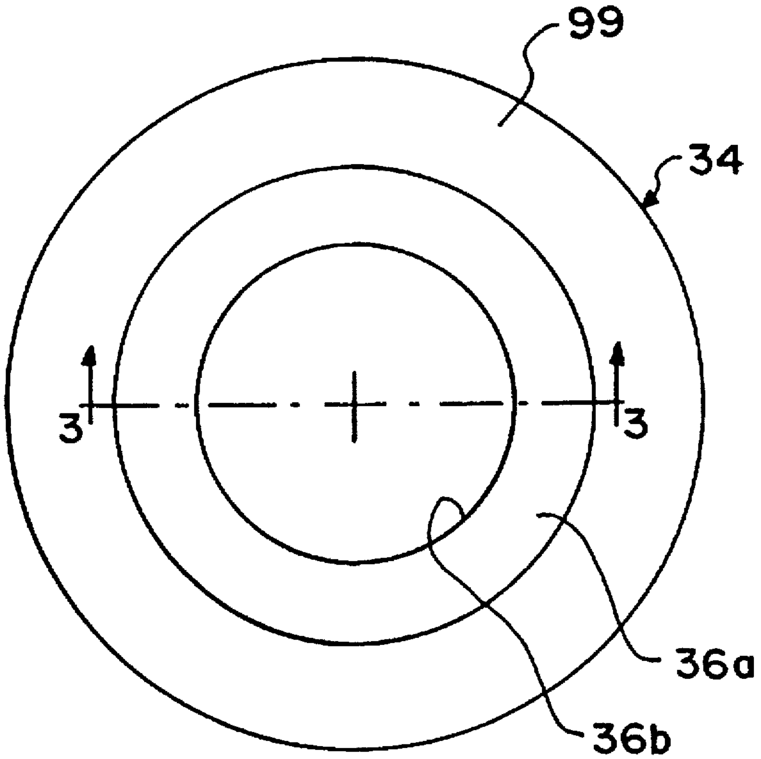
FIG. 2 is a top plan view of one of the parts of the EEGR valve shown by itself, namely a valve seat.
Figure 5:
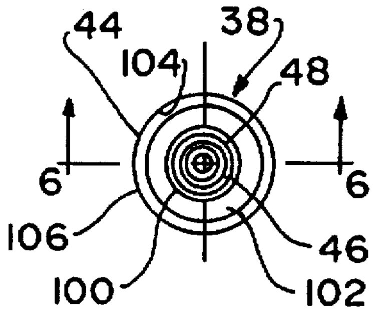
FIG. 5 is a top view of FIG. 4.
Figure 6:
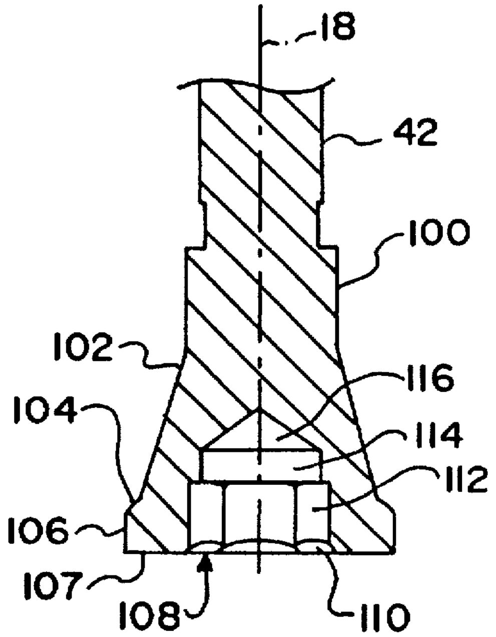
FIG. 6 is a fragmentary cross sectional view taken in the direction of arrows 6—6 in FIG. 5 on a larger scale.
Figure 4:
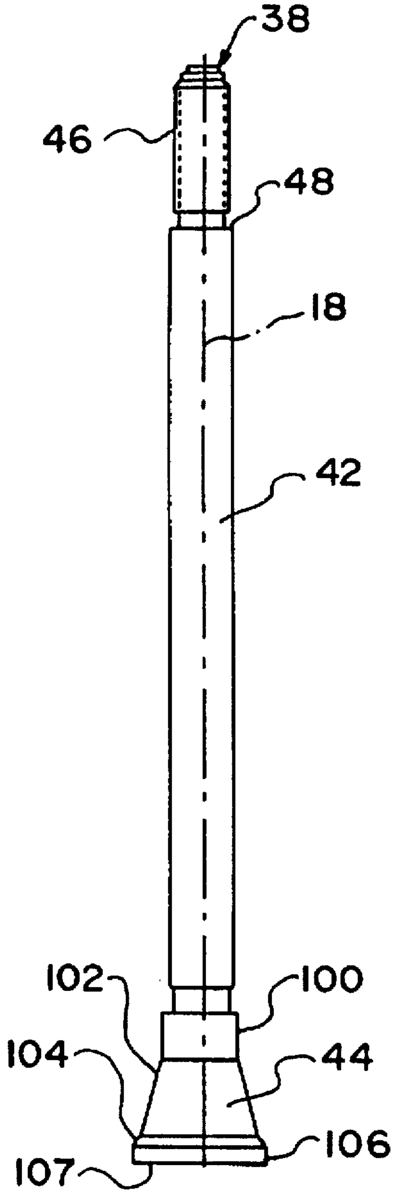
FIG. 4 is an elevation view of another of the parts of the EEGR valve shown by itself on a larger scale, namely a pintle valve element.
Figure 7:
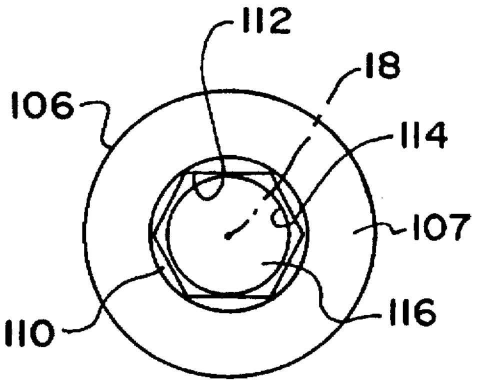
FIG. 7 is a full bottom view of FIG. 6 on the same scale.

Valve seat 34, detail of which is shown in FIGS. 2 and 3, has an annular shape comprising a through-hole having a frusto-conically tapered surface 36*a* extending from the upper face of the valve seat to a straight circular cylindrical surface 36*b* extending to a frusto-conically tapered surface 36*c* at the lower end face of the valve seat. A circular perimeter rim 99 extends around the outside of the upper end of valve seat 34. Base 12 is constructed with a counterbore providing a shoulder onto which rim 99 seats when the valve seat is pressed into base 12 and secured in place on the base. The side wall of the valve seat tapers inward below rim 99.

Surface 36*c* ends at the inner edge of an annular surface 37 that is perpendicular to axis 18. The exterior of the valve seat comprises a frusto-conically tapered surface 36*d* extending parallel to surface 36*a* from the outer edge of surface 37 to the inner edge of an annular surface 36*e* that is perpendicular to axis 18. Because the wall of the seat has a constant thickness between surfaces 36*a* and 36*d*, temperature variation along surface 36*a* is minimized to aid in preventing carbon impurities from being deposited on surface 36*a*. An area "A" is surrounded by base 12, surface 36*d*, and surface 36*e*. This area "A" is situated upwardly away from the lower edge of surface 104 and provides a space where carbon-impurities may be intercepted and deposited.

Details of pintle valve head 44 are illustrated in FIGS. 4–7. Valve head 44 has an outer perimeter that is shaped to comprise a straight circular cylindrical surface 100 from the lower edge of which a frusto-conical tapered surface 102 flares radially outwardly to a further frusto-conical tapered surface 104 of larger flaring taper, but shorter axial dimension, than that of surface 102. The pintle further comprises a straight circular cylindrical surface 106 extending downwardly from the lower edge of surface 104 to a flat bottom surface 107 that has a generally circular shape but contains a central blind hole 108 that extends upwardly in the valve head concentric with axis 18. This blind hole comprises a chamfer 110 extending from surface 107 to a polygonally shaped surface 112, which in the illustrated embodiment is a hexagon shape that provides a surface that can be engaged by a similarly shaped tool for assembly purposes. Immediately further inward of surface 112 is a straight circular cylindrical surface 114 of slightly smaller diameter than the maximum diameter across surface 112. The innermost part of hole 108 is a conically shaped space 116 extending from surface 114 to a tip lying on axis 18. As can be seen in FIG. 1, surface 104 closes against surface 36*c* when EEGR valve 10 is closed. Importantly, the taper of surface 104 is preferably less than one degree smaller than that of surface 36*c*. In the preferred embodiment the taper angle of surface 36*c* is forty-five degrees about axis 18 with a tolerance of +1, −0 degree while the taper angle of head surface 104 is forty-six degrees about axis 18 with a tolerance of +0, −1 degree. The axial dimension of surface 36*c*, as measured along axis 18, is 0.2 mm; the axial dimension of surface 104, as measured along axis 18, is slightly greater. Both the pintle and the valve seat are cold drawn stainless steel with the pintle having Just slightly higher hardness.

Thus, rather than being a solid mass throughout, the pintle head may be generally described as comprising a skirt-like wall at its tip end that extends axially upwardly from surface 107 well past surface 104. The desired geometrical relationship of the radially outer surfaces of the pintle head, such as surface 104, to the radially inner surfaces of valve seat 34 is unaffected by hole 108. This construction reduces the mass, and hence the thermal inertia, of the pintle head, which serves to eliminate, or at least significantly reduce, the tendency for carbon build-up. Reduced pintle mass also enhances valve response speed.

While the foregoing has disclosed a presently preferred embodiment of the invention, it should be understood that the inventive principles are applicable to other equivalent embodiments that fall within the scope of the following claims.

What is claimed is:

1. An exhaust gas recirculation (EGR) valve for an internal combustion engine comprising an enclosure including a base, an entrance at which engine exhaust gas to be recirculated enters said base, a passageway that extends through said base for conveying engine exhaust gas that has entered said entrance, an exit at which engine exhaust gas that has passed through said passageway exits said base, an annular valve seat that is disposed within said passageway concentric with an imaginary axis, a pintle that is disposed within said enclosure for selective positioning along said axis, said pintle comprising a shaft and a head that is disposed at an end of said shaft and cooperatively associated with said valve seat for selectively setting the extent to which flow can pass through said passageway in accordance with the position of said pintle along said axis, actuating means for selectively positioning said pintle along said axis to selectively position said head relative to said valve seat, said pintle head and said valve seat comprising respective tapered surfaces that close against each other when said pintle is operated to a closed position by said actuating means and that separate to allow flow through said passageway when said pintle is operated to a selected open position by said actuating means, said pintle head comprising an end surface spaced axially beyond said respective tapered surfaces relative to said pintle shaft, and a central blind hole extending axially from said pintle head end surface to at least axially beyond said respective tapered surfaces when said respective tapered surfaces are closed against each other to thereby provide said pintle head with a skirt-like wall disposed about said axis.

2. An EGR valve as set forth in claim 1 in which said blind hole comprises a polygonally shaped surface.

3. An EGR valve as set forth in claim 2 in which said blind hole further comprises a circular cylindrical surface axially inward of said polygonally shaped surface.

4. An EGR valve as set forth in claim 3 in which said blind hole further comprises a cone-shaped surface axially inward of said circular cylindrical surface.

5. An EGR valve as set forth in claim 4 in which said blind hole further comprises a chamfer disposed axially between said pintle head end surface and said polygonally-shaped surface.

6. An EGR valve as set forth in claim 4 in which said polygonally-shaped surface is a hexagon.

7. An EGR valve as set forth in claim 2 in which said polygonally-shaped surface extends axially inwardly beyond said respective tapered surfaces when said respective tapered surfaces are closed against each other.

8. An EGR valve as set forth in claim 1 in which said valve seat comprises a circular cylindrical surface immediately axially inward of said valve seat's tapered surface, and said pintle head comprises a further tapered surface immediately axially inwardly of said pintle head's tapered surface that closes against said valve seat's tapered surface when said pintle is in closed position.

9. An EGR valve as set forth in claim 8 in which said valve seat further comprises a further tapered surface immediately axially inward of said valve seat's circular cylindrical surface.

10. An EGR valve as set forth in claim 9 in which said valve seat's further tapered surface extends axially inward beyond the axially inward extend of said blind hole.

11. An EGR valve as set forth in claim 1 in which said actuating means comprises an electric actuator.

* * * * *